US011945247B2

(12) United States Patent
Mon

(10) Patent No.: US 11,945,247 B2
(45) Date of Patent: Apr. 2, 2024

(54) TEXTILE SUBSTRATE WITH VISUAL COMPONENTS

(71) Applicant: NIKE, Inc., Beaverton, OR (US)

(72) Inventor: Scott Mon, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 17/383,973

(22) Filed: Jul. 23, 2021

(65) Prior Publication Data

US 2021/0347190 A1 Nov. 11, 2021

Related U.S. Application Data

(62) Division of application No. 16/118,071, filed on Aug. 30, 2018, now Pat. No. 11,097,564.

(60) Provisional application No. 62/553,498, filed on Sep. 1, 2017.

(51) Int. Cl.

| | |
|---|---|
| ***B41M 3/00*** | (2006.01) |
| ***B41J 3/407*** | (2006.01) |
| ***B44F 1/10*** | (2006.01) |
| ***D06P 1/00*** | (2006.01) |
| ***D06P 5/30*** | (2006.01) |
| *B41M 1/12* | (2006.01) |
| *B41M 1/18* | (2006.01) |
| *B41M 1/30* | (2006.01) |

(52) U.S. Cl.

CPC ........... *B41M 3/008* (2013.01); *B41J 3/4078* (2013.01); *B44F 1/10* (2013.01); *D06P 1/004* (2013.01); *D06P 5/30* (2013.01); *B41M 1/12* (2013.01); *B41M 1/18* (2013.01); *B41M 1/30* (2013.01)

(58) Field of Classification Search

CPC .... B41M 3/008; B41M 3/4078; B41M 3/148; B44F 1/10; D06P 1/004; D06P 5/30

See application file for complete search history.

(56) References Cited

U.S. PATENT DOCUMENTS 4,879,161 A 11/1989 Raymond et al.
5,028,950 A 7/1991 Fritsch
5,438,429 A 8/1995 Haeberli et al.
5,515,779 A 5/1996 Danby
5,695,346 A 12/1997 Sekiguchi et al.
(Continued)

FOREIGN PATENT DOCUMENTS

CN 1875152 A 12/2006
CN 102666124 A 9/2012
(Continued)

OTHER PUBLICATIONS

Dalloz et al., "How to design a recto-verso print displaying different images in various everyday-life lighting conditions", Electronic Imaging 2017.8, 2017, 10 pages.
(Continued)

*Primary Examiner* — Jennifer Bahls
*Assistant Examiner* — Quang X Nguyen
(74) *Attorney, Agent, or Firm* — Shook, Hardy & Bacon L.L.P.

(57) ABSTRACT

Aspects are directed to a textile substrate with two or more ink layers and methods for printing a textile substrate. The two or more ink layers may include one or more visual components that form graphics or images that are visible to an observer when viewing the textile substrate from different angles.

15 Claims, 13 Drawing Sheets

(56) References Cited

U.S. PATENT DOCUMENTS

| | | | | |
|---|---|---|---|---|
| 5,738,746 | A | 4/1998 | Billingsley et al. | |
| 6,000,332 | A | 12/1999 | Hruby et al. | |
| 6,329,987 | B1 | 12/2001 | Gottfried et al. | |
| 6,366,407 | B2 | 4/2002 | Rivera et al. | |
| RE38,065 | E | 4/2003 | Bravenec et al. | |
| 6,623,366 | B2 | 9/2003 | Fiedler | |
| 7,575,027 | B2 | 8/2009 | Huang | |
| 8,416,499 | B2 | 4/2013 | Liu et al. | |
| 9,147,136 | B2 | 9/2015 | Shirotori | |
| 9,348,069 | B2 | 5/2016 | Liles et al. | |
| 9,361,717 | B2 | 6/2016 | Zomet | |
| 9,575,229 | B2 | 2/2017 | Liles et al. | |
| 9,641,702 | B2 | 5/2017 | Bin-nun et al. | |
| 10,039,332 | B2 | 8/2018 | Sokolowski et al. | |
| 2004/0233463 | A1 | 11/2004 | Hersch et al. | |
| 2004/0263885 | A1 | 12/2004 | Tomczyk | |
| 2007/0202299 | A1 | 8/2007 | Huang | |
| 2007/0202300 | A1 | 8/2007 | Huang | |
| 2007/0281140 | A1 | 12/2007 | Haubrich et al. | |
| 2007/0281177 | A1 | 12/2007 | Haubrich et al. | |
| 2009/0091591 | A1 | 4/2009 | Sivan et al. | |
| 2012/0176652 | A1* | 7/2012 | Green | B42D 25/346 358/3.28 |
| 2014/0020191 | A1 | 1/2014 | Jones et al. | |
| 2015/0100145 | A1 | 4/2015 | Selvarajan | |
| 2016/0081409 | A1 | 3/2016 | Loester | |
| 2016/0131805 | A1 | 5/2016 | Smith et al. | |
| 2016/0327708 | A1 | 11/2016 | Liles et al. | |
| 2017/0105464 | A1 | 4/2017 | Leung et al. | |
| 2017/0225491 | A1* | 8/2017 | Miller | A41D 31/02 |
| 2018/0004075 | A1 | 1/2018 | Kubo | |
| 2018/0178550 | A1 | 6/2018 | Kremers et al. | |
| 2019/0070879 | A1 | 3/2019 | Mon | |

FOREIGN PATENT DOCUMENTS

| | | | |
|---|---|---|---|
| CN | 105916402 | A | 8/2016 |
| GB | 492343 | | 9/1938 |
| JP | 10-324050 | A | 12/1998 |
| JP | 2003-94790 | A | 4/2003 |
| KR | 10-1514926 | B1 | 4/2015 |
| WO | 94/15492 | A1 | 7/1994 |
| WO | 96/24490 | A1 | 8/1996 |
| WO | 03/088775 | A2 | 10/2003 |
| WO | 2005/027696 | A1 | 3/2005 |
| WO | 2006/028615 | A2 | 3/2006 |
| WO | 2015/139625 | A1 | 9/2015 |
| WO | 2016/178402 | A1 | 11/2016 |
| WO | 2017/136694 | A1 | 8/2017 |

OTHER PUBLICATIONS

Shethia, Tejas, “3D View Change—Screen Print”, You Tube, youtube.com, Oct. 25, 2011, 2 pages.

“Transition Sign Lenticular Print Set”, Bethesda® Store, bethsoft.com, Jul. 2017, 2 pages.

* cited by examiner

TEXTILE SUBSTRATE WITH VISUAL COMPONENTS

CROSS-REFERENCE TO RELATED APPLICATIONS

This application, entitled "TEXTILE SUBSTRATE WITH VISUAL COMPONENTS," is a divisional application of U.S. application Ser. No. 16/118,071, filed Aug. 30, 2018, and entitled "TEXTILE SUBSTRATE WITH VISUAL COMPONENTS," which claims the benefit of priority of U.S. Provisional Application No. 62/553,498, filed Sep. 1, 2017, and entitled "TEXTILE SUBSTRATE WITH VISUAL COMPONENTS." The entireties of the aforementioned applications are incorporated by reference herein.

FIELD OF THE INVENTION

Textile substrate having two or more ink layers that form a print.

BACKGROUND

Traditional applications of ink to a textile substrate commonly include one or more ink layers that form a uniformly flat surface on the textile substrate. Generally, the one or more ink layers include multiple colors at different areas of the textile substrate that interact and contrast to collectively form a single graphic or image, and as long as an observer has a clear view of the textile substrate, the single graphic or image is visible to the observer from all viewing angles.

BRIEF DESCRIPTION OF THE DRAWINGS

The present invention is described in detail herein with reference to the attached drawing figures, wherein.

DETAILED DESCRIPTION

Figure 1:
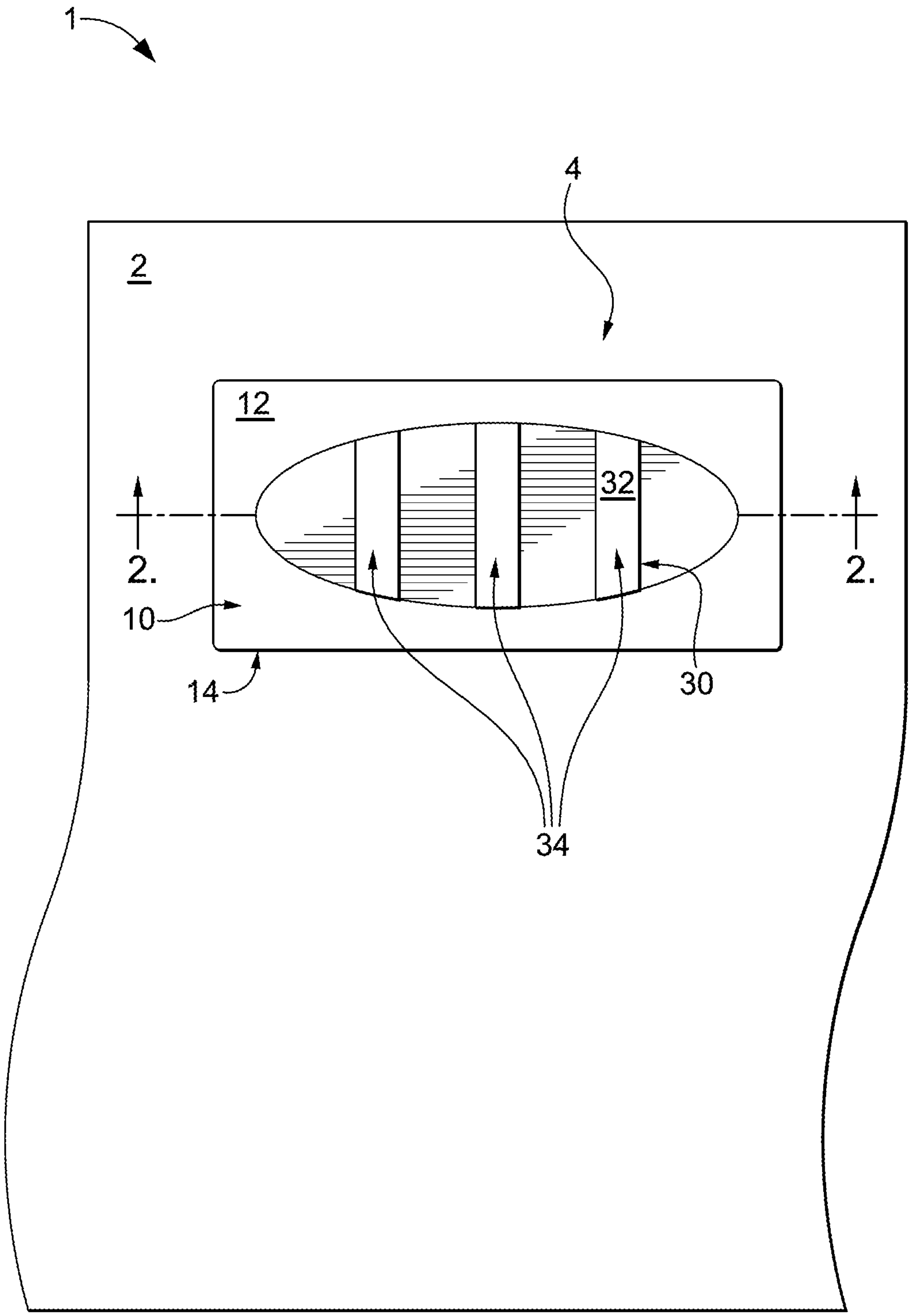
FIG. 1 depicts a top view of a textile substrate, in accordance with an aspect hereof.

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

At a high level, aspects herein are directed toward a textile substrate that may include a surface, an area (e.g., a surface area), and two or more ink layers that form a print on the textile substrate. In one aspect, a textile substrate may include a textile substrate surface and at least a first area, and the textile substrate may comprise a first, second, and third ink layer. More specifically, the first ink layer may be positioned overtop the textile substrate surface at the first area and may comprise a first ink layer surface that is distal to the textile substrate surface and a first visual component. The second ink layer may be positioned overtop at least a portion of the first ink layer surface, and the second ink layer may comprise a second ink layer top surface that is distal to the first ink layer surface, a second ink layer bottom surface that is opposite the second ink layer top surface, and a second visual component. The third ink layer surface may be positioned overtop the second ink layer top surface and may comprise a third visual component that may be configured to mask the second visual component when the textile substrate is viewed from a first angle. Moreover, a visibility of the second visual component may change when the textile substrate is viewed from an angle that is different than the first viewing angle.

In another aspect, a textile substrate may include a textile substrate surface and at least a first area and a second area, and the textile substrate may comprise a first, second, and third ink layer. The first ink layer may be positioned overtop the textile substrate surface at the first and second areas of the textile substrate, and the first ink layer may comprise a first visual component at the first area and a second visual component at the second area. The second ink layer may be positioned overtop the first ink layer at the first and second areas of the textile substrate, and the second ink layer may comprises a third visual components. The third ink layer may be positioned overtop the second ink layer at the first and second areas, and the third ink layer may comprises a fourth visual component at the first area and a fifth visual component at the second area. Moreover, the fourth visual component may be configured to visually match the first visual component of the first ink layer, and the fifth visual component may be configured to visually match the second visual component of the first ink layer. Further, at a first viewing angle, the fourth and fifth visual components of the third ink layer may obstruct a visibility of the third visual component of the second ink layer.

Other aspects herein are directed toward a method of printing a textile substrate and may generally include a first step of providing the textile substrate that may be followed with multiple steps of applying printed layers onto the textile substrate. In accordance with these aspects, a method of printing a textile substrate may begin with a first step of providing a textile substrate that has a textile substrate surface and at least a first area. Next, the method may include a second step of applying a first printed layer over the textile substrate surface at the first area of the textile substrate surface, and the first printed layer may comprise a first visual component. A third step of the method may include applying a second printed layer over at least a portion of a surface of the first printed layer that is distal to the textile substrate surface, and the second printed layer may comprise one or more layers of ink and a second visual component. Lastly, the method may include a fourth step of applying a third printed layer over a surface of the second printed layer that is distal to the first printed layer, and the third printed layer may comprise a third visual component that masks the second visual component of the second printed layer when the textile substrate is viewed from a first angle. Further, application of the third printed layer may cause a visibility of the second visual component to change when the textile substrate is viewed from an angle that is different than the first angle.

As discussed above and as will be discussed throughout, aspects herein are directed to methods of printing a textile substrate and are also directed to a textile substrate, which may or may not be printed by the provided methods. Many aspects relate to both the methods of printing a textile substrate and a textile substrate itself, and therefore, some aspects may be described in differing manners depending on context. For example, a layer of ink may be referred to as "an ink layer" when included in a textile substrate or as "a printed layer" when applied to a textile substrate. Regardless, aspects described in connection with a layer of ink may be applicable to both "an ink layer" and "a printed layer." Accordingly, contextual descriptions of any aspects provided herein are not limiting to the scope of applicability for any claimed aspects.

Moreover, aspects contemplated herein may be presented in a simplified fashion as an example but in practice, are more complex. For example, a textile substrate is described and shown as a single component, but it is contemplated herein that a textile substrate may be utilized to form a variety of objects and may be incorporated into such objects as one or more individual parts. In one example, a textile substrate may include a fabric panel, which may be joined together using a variety of adhesives, stitches, and other types of joining/bonding components to produce any article of apparel including, but not limited to, sweatshirts, tank tops, shorts, pants, jackets, socks, leg sleeves, arm sleeves, headbands, hats, shoes, and the like.

Continuing with these aspects, other objects that a textile substrate may form or be incorporated into include, but are not limited to, sporting equipment, such as shin guards, protective pads, duffle bags, backpacks, protective helmets, and the like.

In further aspects, a textile substrate may have a non-rigid, planar structure and be formed from a material that is suitable for an end use of a textile substrate, and characteristics that are included in a textile substrate may be dependent on an end use. For instance, when a textile substrate includes a fabric panel, a textile substrate may form at least part a portion of a fabric panel that is incorporated into an article of apparel, and such a textile substrate may comprise one or more materials that are suitable for or provide desirable characteristics to a specific article of apparel including breathable materials, materials with a desired drape or hand, wicking fabrics, stabilizing components, and/or elastic elements for comfort and/or tailoring a fit of an article of apparel.

Moreover, aspects herein contemplate that a textile substrate may be formed from any type of textile material, such as a knitted material, a woven material, a film material, leather, a non-woven material, a fabric material, a cloth material, and the like. Further, materials used to construct a textile substrate may include natural fibers, artificial fibers, or combinations thereof, and a textile substrate may be constructed by traditional methods such as weaving, knitting, crocheting, knotting, felting, and the like. In these aspects, it is contemplated that a textile substrate may comprise materials such as polyester, nylon, cotton, spandex, rayon, cellulose, and blends thereof that may be included in a textile substrate in certain amounts. For example, a textile substrate may be constructed into a fabric comprising a blend of cotton and polyester, and in another example, the fabric may comprise 100% polyester. Any and all aspects, and any variation thereof, are contemplated as being within aspects herein.

Other aspects contemplate that a textile substrate may comprise a color (e.g., a base color), which may be any of the colors provided by pigments, as well as other coloring elements that are included in commercially available inks and dyes. In these aspects, materials that have been dyed or otherwise colored may be used to construct a textile substrate. Or, after a textile substrate is constructed, the textile substrate itself may be dyed or otherwise colored. In further aspects, a textile substrate may be configured to include characteristics that are suitable for producing a print on a textile substrate. For instance, a textile substrate may be formed of a material that is more compatible with a certain ink or dye or requires less pre-treatment before an application of an ink or a dye.

As will be evident hereinafter, aspects herein are directed toward two or more ink layers overtop a surface of a textile substrate, and each ink layer may include a variety of features and characteristics that may collectively form a print with two or more distinguishable images or graphics on a textile substrate. As used herein, the term "overtop" may mean elements (i.e., different print layers and/or print layers and a textile substrate) that are positioned adjacent to each other such that respective surfaces of each element are in contact with each other. Equivalent terms for the term "overtop" may include "layered on," "overlay," "positioned adjacent to," and the like. Continuing, a visibility of an image or graphic included in a print may change when an observer views the textile substrate from different viewing angles, and thus, an image or graphic may be hidden when an observer views the textile substrate from one angle but the image or graphic may then be revealed when an observer views the textile substrate from a different angle. These aspects may be dependent on features and characteristics of each ink layer and may be more easily understood with a basic understanding of an ink layer. Thus, aspects related to an ink layer are provided immediately below.

Aspects related to an ink layer contemplate one or more inks that may form an ink layer, structural features of an ink layer, and an arrangement of an ink layer at an area of a textile substrate. Some of these aspects may afford or impart a visual component to the ink layer, which may form part or all of an image or graphic included in a print on a textile substrate. Additionally, aspects related to an ink layer may contemplate one or more printing techniques that may be utilized to apply a printed layer over a textile substrate, and further, aspects related to an ink layer may also contemplate a configuration of two or more ink layers overtop a textile substrate. All of these aspects may affect a print on a textile substrate, and each aspect is discussed in this order in the following paragraphs.

Beginning with one or more inks that may form an ink layer, aspects herein contemplate that an ink layer may be formed by a wide range of inks that are compatible with at least one printing technique discussed herein. Generally, these inks may include commercially available inks that are known by those having ordinary skill in the art, or proprietary inks, to be used with screen printing and digital printing techniques. Such inks may be water-based or oil-based and may include, but are not limited to cracking ink, discharge ink, glitter or shimmer ink, gloss ink, metallic ink, mirrored silver ink, plastisol ink, polyvinyl chloride ink (PVC-ink), non-PVC-ink, phthalate ink, non-phthalate ink, acrylic ink, suede ink, oil-based acrylic ink, polyurethane ink, high density ink, solvent ink, ultraviolet ink, and combinations thereof. Notwithstanding, it is also contemplated that an ink may include specialty inks, which may have one or more properties that are not typically included in commercially available inks. Such properties may include a visual characteristic that may give a specialty ink a metallic, pearlescent, color shift, or reflective appearance. Moreover, any of these inks may include additives, which may affect certain properties or components of an ink or may afford an ink additional properties or components. For example, an additive may cause an ink to be more compatible with certain inks and materials, and thus, an additive may be used to promote compatibility between adjacent ink layers and between an ink layer and an adjacent textile substrate.

As mentioned, an ink may have properties and components that may be imparted to an ink layer, which may include one or more visual features. Such aspects contemplate that one or more visual features of an ink an ink may include one or more color components, which may be afforded by a pigment or other colorants. As such, an ink may be configured to be of any color including red, orange, yellow, green, blue, indigo, violet, and shades and combinations thereof. Moreover, when an ink is applied via digital printing techniques, an ink may be configured to be any color that may be produced by printers that are utilized in digital printing techniques, which may include magenta, cyan, yellow, orange, red, black, black, gray, blue, gray, and shades thereof. It is further contemplated that an ink may have other visual features that may include one or more visual characteristics that may be configured to afford an ink a reflective, metallic, clear, white, black, or colorless appearance. Further, a color component or a visual characteristic of an ink may be maintained during and after application of an ink to a textile substrate or a lower (i.e., previously applied) ink layer, and in one example, aspects of an ink layer may include multiple inks with multiple color components, multiple visual characteristics, or combinations thereof that form an image or a graphic on a textile substrate.

Turning now to structural aspects of an ink layer, such aspects contemplate that an ink layer may be planar (or relatively planar) and may have two opposite ink layer surfaces. Moreover, an ink layer may include a height, which may be a distance an ink layer extends between two opposite ink layer surfaces or may also be a distance that an ink layer extends away from a surface of a textile substrate or from a surface of a previously applied ink layer. To describe it in a different way, a particular ink layer may be thought of as extending in an x, y surface plane. The particular ink layer, in one example, may also extend in the z-direction away from the surface plane of the ink layer. In such aspects, it is contemplated that an ink layer may be formed of multiple sublayers, which may be selectively implemented or applied to increase a height of the ink layer. Additionally, an ink layer may also include one or more exterior sides that may extend between two opposite ink layer surfaces. In some aspects, it is contemplated than an ink layer may be a unitary, flat layer, and other aspects contemplate that an ink layer may include one or more discrete members or elements. Further, the one or more discrete members may be linear or curvilinear, and each discrete member may have a similar size or may comprise a different size. Any and all aspects, and any variation thereof, are contemplated as being within aspects herein.

In aspects related to an arrangement of an ink layer at an area of a textile substrate, it is contemplated that an ink layer may extend throughout an entirety of an area. It is also contemplated that an ink layer may be included in a portion of the area at one or more separate locations, which may be uniformly or non-uniformly positioned throughout the area, and in these aspects, the ink layer may include one or more discrete members. As such, an ink layer may be arranged in a linear manner throughout a portion of an area such that one or more discrete members form a linear pattern or design. In other aspects, an ink layer may be arranged in a curvilinear manner throughout a portion of an area such that one or more discrete members form a curvilinear pattern or a design.

Further aspects contemplate an application of an ink layer overtop a textile substrate or an ink layer by using one or more printing techniques. Generally, a printing technique may include any printing application known to those having ordinary skill in the art that is compatible with and suitable for printing one or more inks discussed herein to form an ink layer. In one aspect, direct printing may be utilized, and at a high level, direct printing may include printing techniques that transfer an ink onto a surface of a textile substrate or an ink layer and may involve a curing step that promotes adhesion between an ink layer and a surface of a textile substrate or an ink layer. Further, these printing techniques involve applying one or more inks to an area of a textile substrate and may be applied such that one or more inks form an image or a graphic on a textile substrate. Known printing techniques that may be implemented as direct printing include, but are not limited to screen printing, rotary printing, direct to garment digital printing or digital direct printing, and combinations of these techniques, such as hybrid printing techniques that includes aspects of both screen printing and direct to garment digital printing.

Aspects herein also contemplate a configuration of two or more ink layers that are positioned overtop a textile substrate, which may involve a structural relationship among each ink layer. In these aspects, each ink layer may be stacked (or layered) on top of one another above a surface of a textile substrate, and each ink layer may be structured and arranged throughout an area of the textile substrate in differing manners. In accordance with these aspects, a first ink layer positioned overtop a surface of the textile substrate may extend throughout an entire area of the textile substrate, and a different ink layer positioned overtop a first ink layer may extend throughout a portion of an area of the textile substrate. As such, a surface of the first ink layer may be an uppermost surface at one portion of an area of the textile substrate, while a surface of the different ink layer may be an uppermost surface at a different portion of the area. Stated another way, a visual feature of an ink layer may be visible at a portion of an area where a respective ink layer surface is exposed, and a visual feature of a different ink layer may be visible at a different portion of the area where that respective ink surface is exposed. Additionally, an ink layer may have a height that is greater than other ink layers, and an ink layer may protrude or extend (e.g., extend in the z-direction) from an inferior ink layer in a manner that presents one or more exterior sides. In these aspects, a visual feature of an ink layer may also be visible on one or more exterior sides when a textile substrate is viewed from a certain angle.

As discussed throughout, a textile substrate may include two or more ink layers, and in primary aspects directed toward an ink layer, it is further contemplated that an ink layer may include one or more visual components. Generally, a visual component may include any aspect or combination of aspects related to an ink layer that may be visible on a textile substrate to an observer. Moreover, it is contemplated that one or more visual components may collectively form a print on a textile substrate with two or more distinguishable images or graphics.

As such, the term "a visual component(s)" is used throughout this description and in the claims to refer to one or more aspects of an ink layer that are visible to an observer when viewing a textile substrate. In these aspects, a visual component may comprise one or more color components of one or more inks that form an ink layer, which may be presented at a surface of the ink layer and at one or more exterior sides of the ink layer, and similarly, a visual component may comprise one or more visual characteristics (e.g., metallic, pearlescent, or reflective, etc.) of one or more inks that form an ink layer and may be presented at a surface of an ink layer or at one or more exterior sides of an ink layer. Additionally, a visual component may comprise a combination of one or more color components and one or more visual characteristics of one or more inks that form an ink layer, and a visual component may be presented at a surface of an ink layer and/or at one or more exterior sides of an ink layer. Moreover, a visual component may comprise an arrangement of an ink layer throughout an area of a textile substrate and may include a pattern or design. Further, a visual component may also comprise one or more images or graphics formed by one or more color components of an ink layer, one or more visual characteristics of an ink layer, an arrangement of an ink layer throughout an area of a textile substrate, and combinations thereof.

In further aspects, an ink layer may include one or more visual components at different areas. For instance, an ink layer may include one color component at one area and a different color component at a different area. In addition, a visual component of an ink layer may be configured to visually match a visual component of another area. In such aspects, a visual component of one ink layer may include a color component and a visual component of another ink layer may also include a same color component. Moreover, when two ink layers that are proximate one another in an area of textile substrate include one or more visual components that visually match, each ink layer may be visually indistinguishable when a textile substrate is viewed from a certain angle.

As can be appreciated from the foregoing, it is contemplated that aspects discussed herein may be implemented in a variety of ways to provide a textile substrate with two or more ink layers that form a print. In particular, an ink layer may include any combination of aspects, which may be selectively employed to affect visual components of multiple ink layers. Moreover, a manner in which two or more ink layers are applied to a textile substrate may also affect which aspects are included in each ink layer, and in turn, affect visual components of each ink layer. Notwithstanding, aspects of the present invention are discussed below with reference to the Figures.

Beginning with FIG. 1, a textile substrate 1 is depicted from a top view, in accordance with aspects hereof. The textile substrate 1 has a textile substrate surface 2 and a first area 4. As discussed herein, the textile substrate 1 may comprise ink layers positioned on the textile substrate surface 2 and at the first area 4, and from this view, a first ink layer 10 and a third ink layer 30 can be seen. The first ink layer 10 comprises a first ink layer surface 12 and a first visual component 14, and similarly, the third ink layer 30 comprises a third ink layer surface 32 and a third visual component 34. In this example, the first ink layer 10 is positioned below (or layered under) the third ink layer 30 and extends throughout an entirety of the first area 4, and the first visual component 14 is presented at the first ink layer surface 12 and includes an outer rectangle and an inner oval. The third ink layer 30 is included at portions of the first area 4 as linear segments, and the third visual component 34 is presented at the third ink layer surface 32 and appears to be a portion of the oval of first visual component 14.

In FIG. 1, the textile substrate 1 is depicted individually for illustrative purposes, but as discussed herein, it is contemplated that the textile substrate 1 may be incorporated into a variety of objects. Further, the first ink layer 10, the first visual component 14, the third ink layer 30, and the third visual component 34 are depicted generically for discussion purposes and may be moved, repositioned, reshaped, duplicated, or reconfigured. Further, it is understood that these depictions are an example and are not limiting. For example, the first visual component 14 is illustrated as an outer rectangle with an inner oval, but it is contemplated that the first visual component 14 may include other shapes and designs or may be more detailed and include an image, a graphic, or a logo.

Figure 2A:
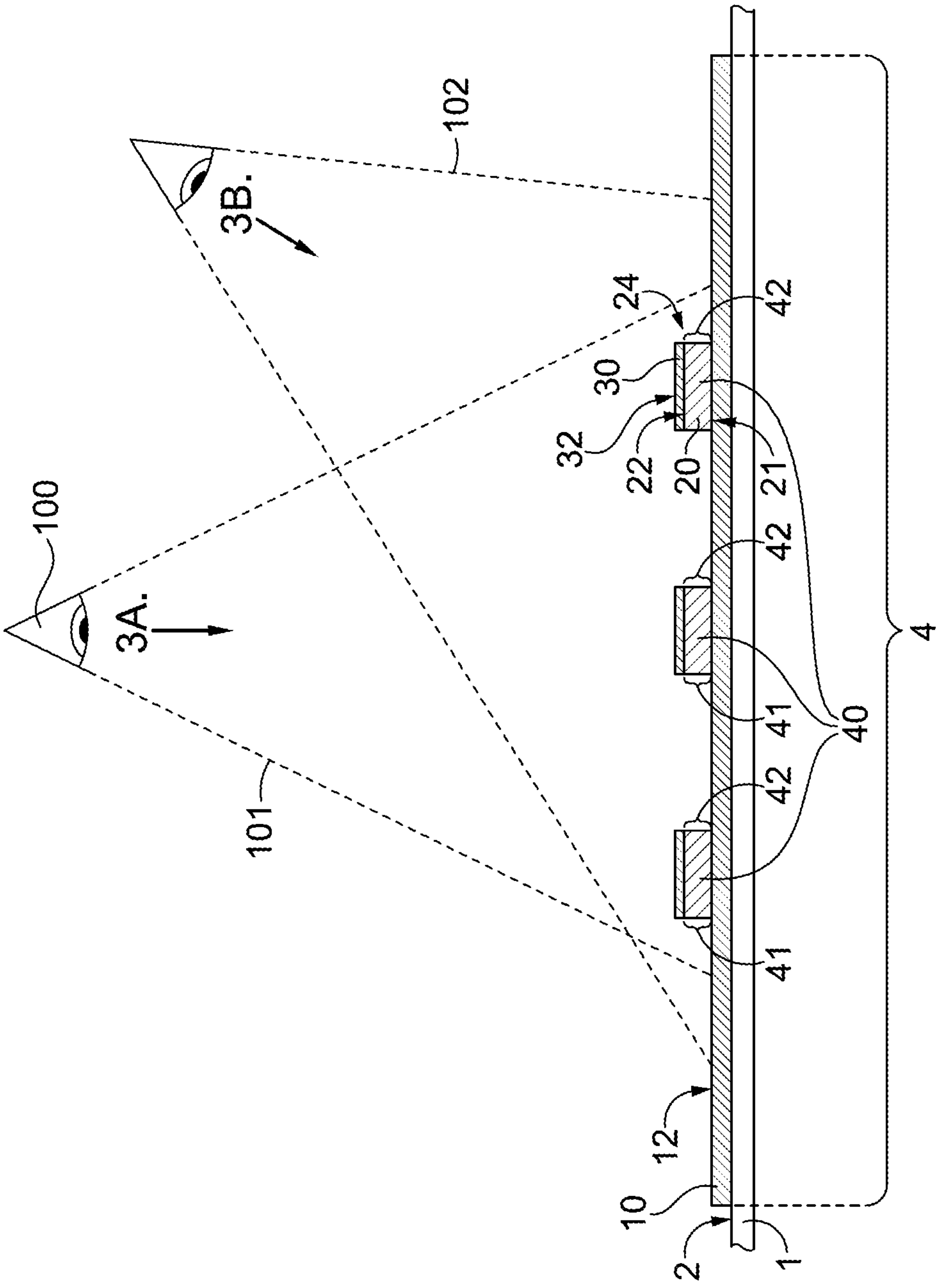
FIG. 2A depicts a cross section view of the textile substrate of FIG. 1 taken along the plane 2 of FIG. 1, in accordance with an aspect hereof.

Turning now to FIG. 2A, a cross section view of the textile substrate 1 taken along the plane 2 of FIG. 1 is depicted. From this view, an additional ink layer can be seen, and as shown, the textile substrate 1 may further comprise a second ink layer 20 that is positioned between the first ink layer 10 and the third ink layer 30. Further, the second ink layer 20 may comprise a second ink layer top surface 22 that is positioned distal to the first ink layer surface 12, a second ink layer bottom surface 21 that is positioned opposite the second ink layer top surface 22, and a second visual component 24. Moreover, the second ink layer 20 further comprises a plurality of discrete members 40, each of which includes two opposite exterior sides, a first exterior side 41 and a second exterior side 42 that extend between the second ink layer bottom surface 21 and the second ink layer top surface 22. In this example, the plurality of discrete members 40 are arranged in a linear and repeating manner throughout a portion of the first area 4, and the second visual component 24 is presented at both the first and second exterior sides 41, 42. Additionally, FIG. 2A also illustrates that the first ink layer surface 12 is positioned distal to the textile substrate surface 2, and that the third ink layer surface 32 is positioned distal to the second ink layer top surface 22.

FIG. 2A further depicts a configuration of the first, second, and third ink layers 10, 20, 30, and as shown, the first ink layer 10 is positioned overtop the textile substrate surface 2, the second ink layer 20 is positioned overtop at least a portion of the first ink layer surface 12 (more specifically, the second ink layer bottom surface 21 is positioned overtop the first ink layer surface 12), and the third ink layer 30 is positioned overtop the second ink layer top surface 22. While only the first, second, and third ink layers 10, 20, 30 are shown, it is contemplated herein, that one or more additional ink layers may be included between the first and second ink layers 10, 20 or between the second and third ink layers 20, 30. Such layers may include anti-migration inks, dye blockers, or inks that are included in the first, second, and third ink layers 10, 20, 30, and it is also contemplated herein that any of the first, second, and third ink layers 10, 20, 30 may include additional ink layers, which may be comprised of the same or different inks.

Figure 3A:
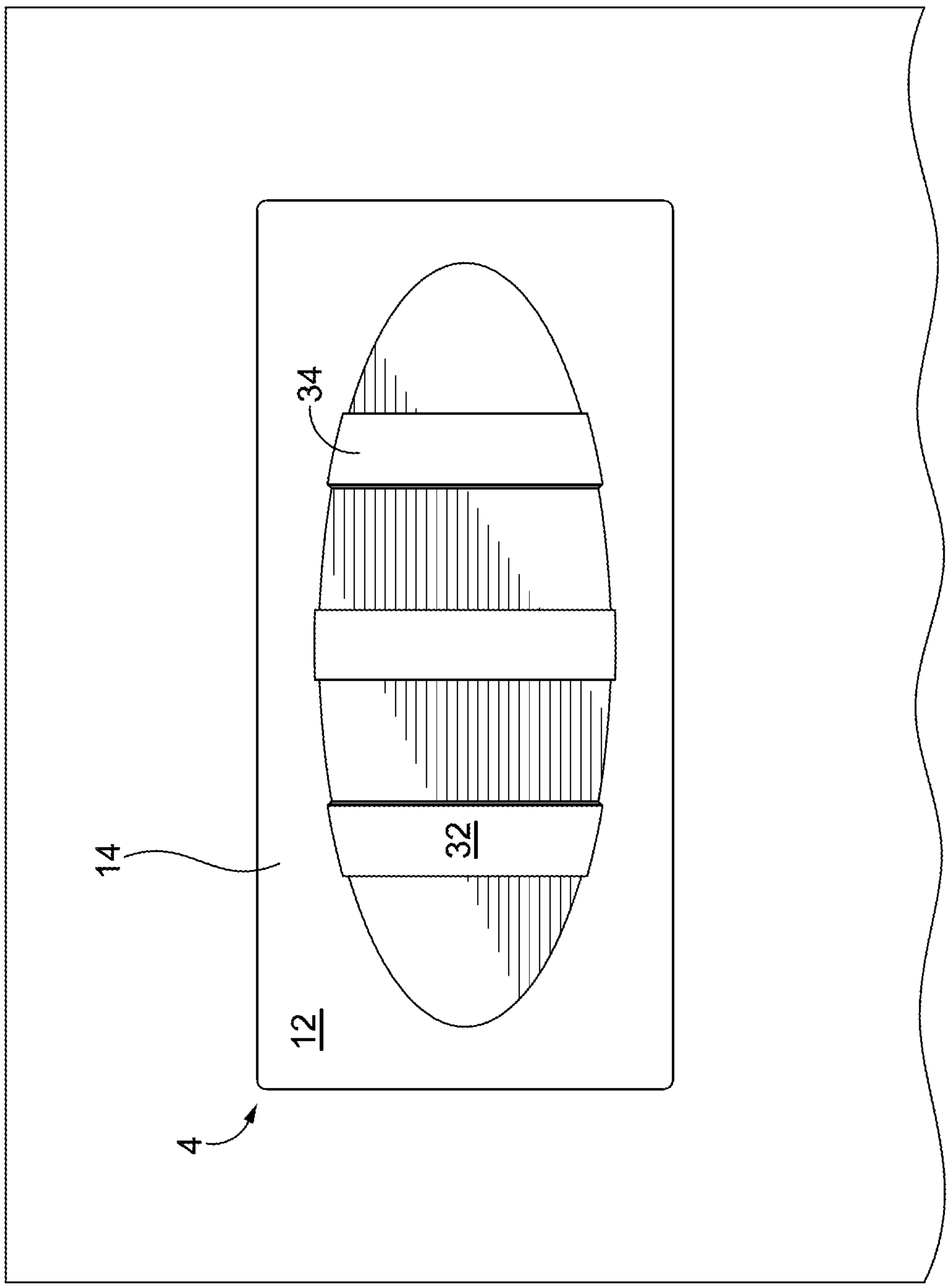
FIG. 3A depicts a view of the textile substrate of FIG. 1 from a first angle, in accordance with an aspect hereof.
Figure 3B:
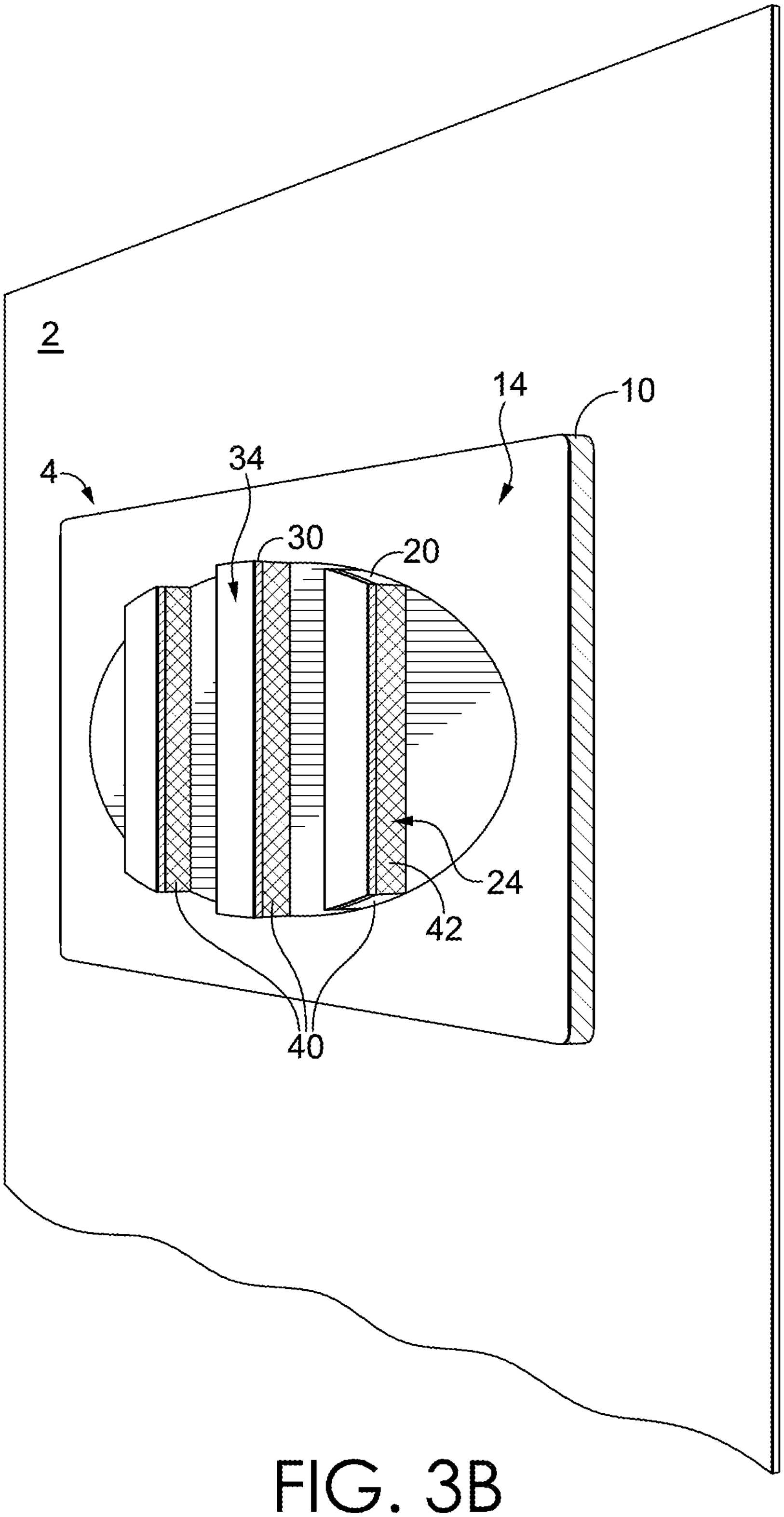
FIG. 3B depicts a view of the textile substrate of FIG. 1 from a second angle, in accordance with an aspect hereof.

Further, FIG. 2A also depicts an observer 100 viewing the textile substrate 1 from a first angle 101 and from a second angle 102, which are respectively illustrated in FIGS. 3A and 3B. In some aspects, the first angle 101 may comprise an angle that is normal (or near normal) to the textile substrate surface 2. For instance, the first angle 101 may comprise an angle from about 85 degrees to about 95 degrees. As used herein, when referring to a degree of an angle, the term "about" means ±2.5 degrees. The second angle 102, in some aspects, may comprise any angle other than the first angle 101. For example, the second angle 102 may comprise an angle from about 5 degrees to about 85 degrees. Moreover, the first, second, and third ink layers 10, 20, 30 include a type of hatching, which represents a visual component that may be presented at an exposed surface or exterior side of an ink layer. As shown, both the first ink layer 10 and the third ink layer 30 include a same type of hatching and have a same visual component, and as such, the first visual component 14 and the third visual component 34 are configured to visually match.

With reference now to FIGS. 2A, 3A, and 3B, as illustrated in FIG. 3A, when the observer 100 views the textile substrate 1 from the first angle 101, the first ink layer surface 12 and the third ink layer surface 32 are exposed, and therefore the first visual component 14 and the third visual component 34 are visible to the observer 100. However, the second ink layer 20 and the second ink layer top surface 22 are positioned below (or layered under) the third ink layer 30 and therefore, the plurality of discrete members 40 and the first and second exterior sides 41, 42 of the second ink layer 20 are predominately hidden or obscured, and the second visual component 24 is not visible to the observer 100. As such, when an observer 100 views the textile substrate 1 from the first angle 101, the third visual component 34 masks the second visual component 24. Conversely, as illustrated in FIG. 3B, when the observer 100 views the textile substrate 1 from the second angle 102, the second exterior sides 42 of the second ink layer 20 are exposed, and therefore, the second visual component 24 is now visible to the observer 100. Although not depicted, when the observer 100 views the textile substrate 1 from an angle that is opposite the second angle 102, or from an opposing side, the observer 100 would see the same components of the textile substrate 1 in FIG. 3B, but the first exterior side 41 would be visible in place of the second exterior side 41.

Figure 2B:
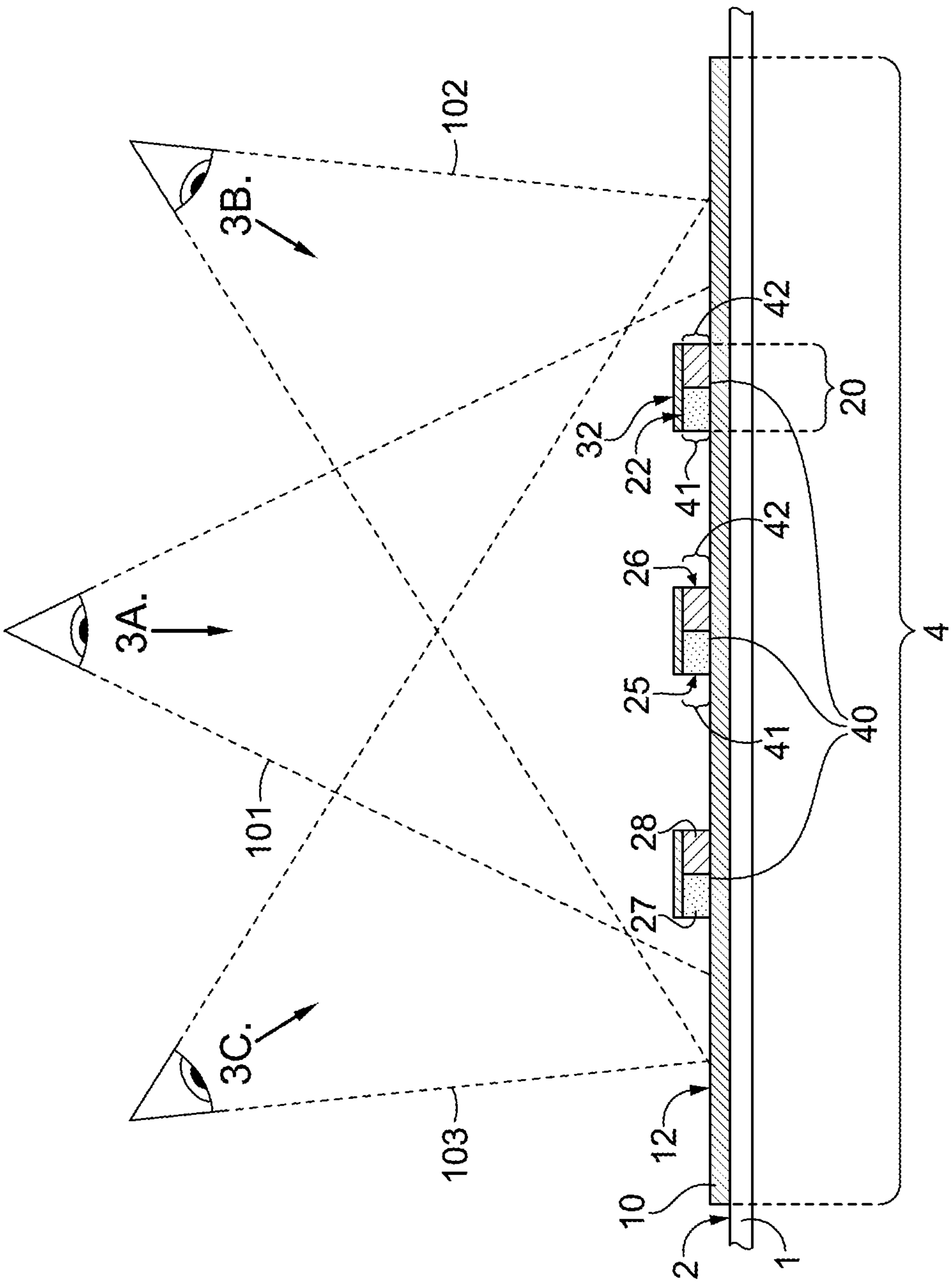
FIG. 2B depicts a cross section view of an additional embodiment of a textile substrate taken along a plane like that of the plane 2 of FIG. 1, in accordance with an aspect hereof.
Figure 3C:
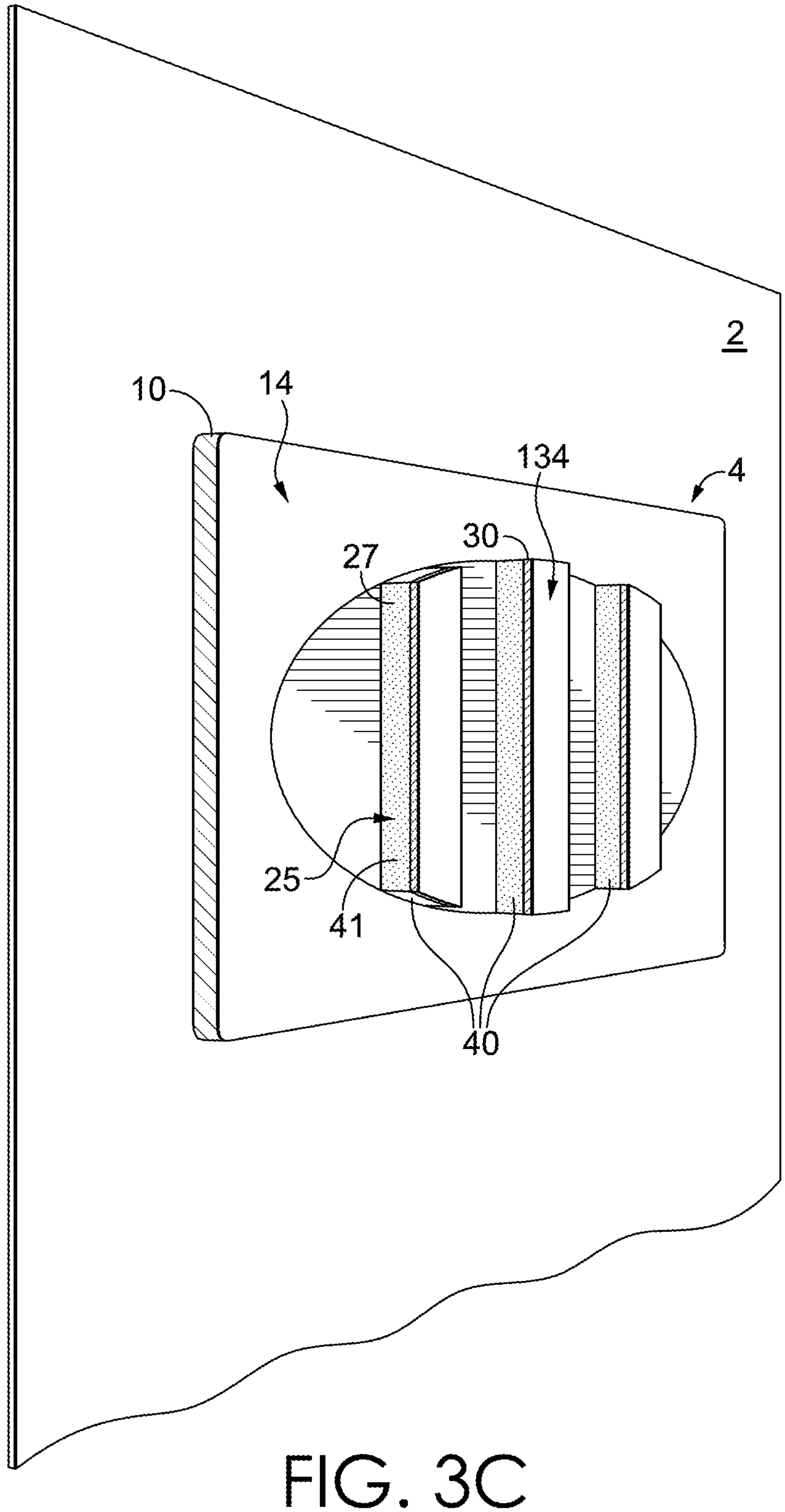
FIG. 3C depicts a view of the textile substrate of FIG. 2B from a third angle, in accordance with an aspect hereof.

Some of these aspects are illustrated in FIGS. 2B and 3C, which depict the textile substrate 1 as including a second ink layer formed by two sub-ink layers and show the textile substrate 1 from a third angle 103. Other than these aspects, the textile substrate 1 comprises the same components as previously discussed in connection with FIGS. 1, 2A, 3A, and 3B. Starting with FIG. 2B, a cross section like that of FIG. 2A is shown, and the second ink layer 20 (not identified) comprises a first sub-ink layer 27 and a second sub-ink layer 28, which are positioned adjacent one another and form one of the discrete members 40. As such, the first exterior side 41 is formed by the first sub-ink layer 27, and the first sub-ink layer 27 may also comprise a first sub-ink layer visual component 25. Likewise, the second exterior side 42 is formed by the second sub-ink layer 28, and the second sub-ink layer 28 may comprise a second sub-ink layer visual component 26, which may be different than the first sub-ink layer visual component 25 (e.g., different color components). Moreover, as illustrated in FIGS. 2A and 2B, the second visual component 24 and the second sub-ink layer visual component 26 may be a similar or same visual component. Accordingly, the observer 100 that depicts the textile substrate 1 in FIG. 2B from the first angle 101 and the second angle 102 would see the same view and features of the textile substrate 1 as shown in FIGS. 3A and 3B, and thus, the observer 100 would see the second sub-ink layer visual component 26 on the second exterior side 42, which would be the same or similar to the second visual component 24.

Notwithstanding and as illustrated in FIG. 3C, the textile substrate 1 of FIG. 2B is viewed from a third angle 103, which is like the second angle 102 only the observer 100 is positioned on an opposite side of the textile substrate 1. As such, the third angle 103 may comprise an angle from about 5 degrees to about 85 degrees or any other angle than the first angle 101. Thus, when the observer 100 views the textile substrate 1 from the third angle 103, the first exterior sides 41 of the first sub-ink layer 27 are exposed, and therefore, the first sub-ink layer visual component 25 is now visible to the observer 100.

In accordance with aspects herein, it is contemplated that the textile substrate 1 may be viewed by the observer 100 from a variety of angles, and in a practical aspect, an angle at which the observer 100 may view the textile substrate 1 may continually change between multiple angles, which may cause certain aspects of the textile substrate 1 to become more or less visible to the observer 100. For instance, as a viewing angle changes from the first angle 101 to the second angle 102, a visibility of the second visual component 24 also changes as more of an exterior side 42 of the second ink layer 20 becomes exposed. Similarly, as a viewing angle changes from the first angle 101 to the third angle 103, a visibility of first sub-ink layer visual component 25 changes as more of an exterior side 41 of the first sub-ink layer 27 becomes exposed.

In FIGS. 4-6B, an additional embodiment of a textile substrate 201 is depicted, and as shown, the textile substrate 201 may comprise many of the same components as the textile substrate 1 of FIGS. 1-3B, but a second ink layer 220 is arranged throughout a first area 204 in a curvilinear manner. Moreover, a third ink layer 230 that is positioned overtop the second ink layer 220 is also different than the third ink layer 30 of the textile substrate 1 in FIGS. 1-3B. Aside from the second ink layers 20, 220, the third ink layers 30, 230, and their respective features and components, all other aspects of the textile substrate 201 are similar and correspond to the aspects of the textile substrate 1 in FIGS. 1-3B. As such, many aspects that were previously discussed in connection with the textile substrate 1 in FIGS. 1-3B may not be repeated in discussion related to the textile substrate 201 in FIGS. 4-6B. This is not meant to be limiting, and any aspects discussed in connection with the textile substrate 1 are also applicable to the textile substrate 201 and vice versa.

Figure 4:
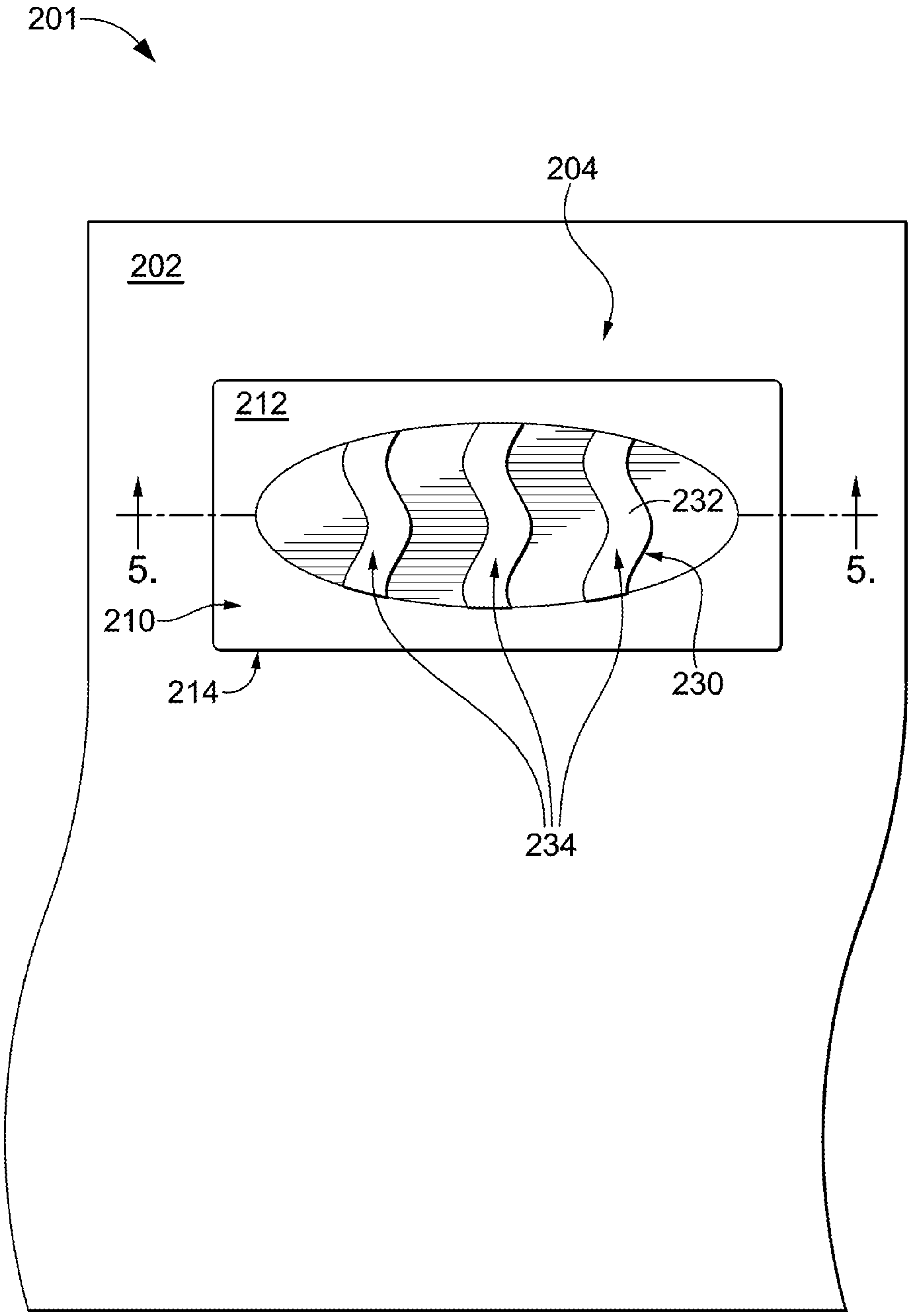
FIG. 4 depicts a top view of an additional embodiment of a textile substrate, in accordance with an aspect hereof.

As shown in FIG. 4, the textile substrate 201 has a first textile substrate surface 202 and a first area 204 and may comprise a first ink layer 210 and the third ink layer 230. The first ink layer 210 comprises a first ink layer surface 212 and a first visual component 214, and likewise, the third ink layer 230 comprises a third ink layer surface 232 and a third visual component 234. The third ink layer 230 is included at portions of the first area 204 as curvilinear segments, and the third visual component 234 is presented at the third ink layer surface 232 and appears to be a portion of an oval of first visual component 214.

Figure 5:
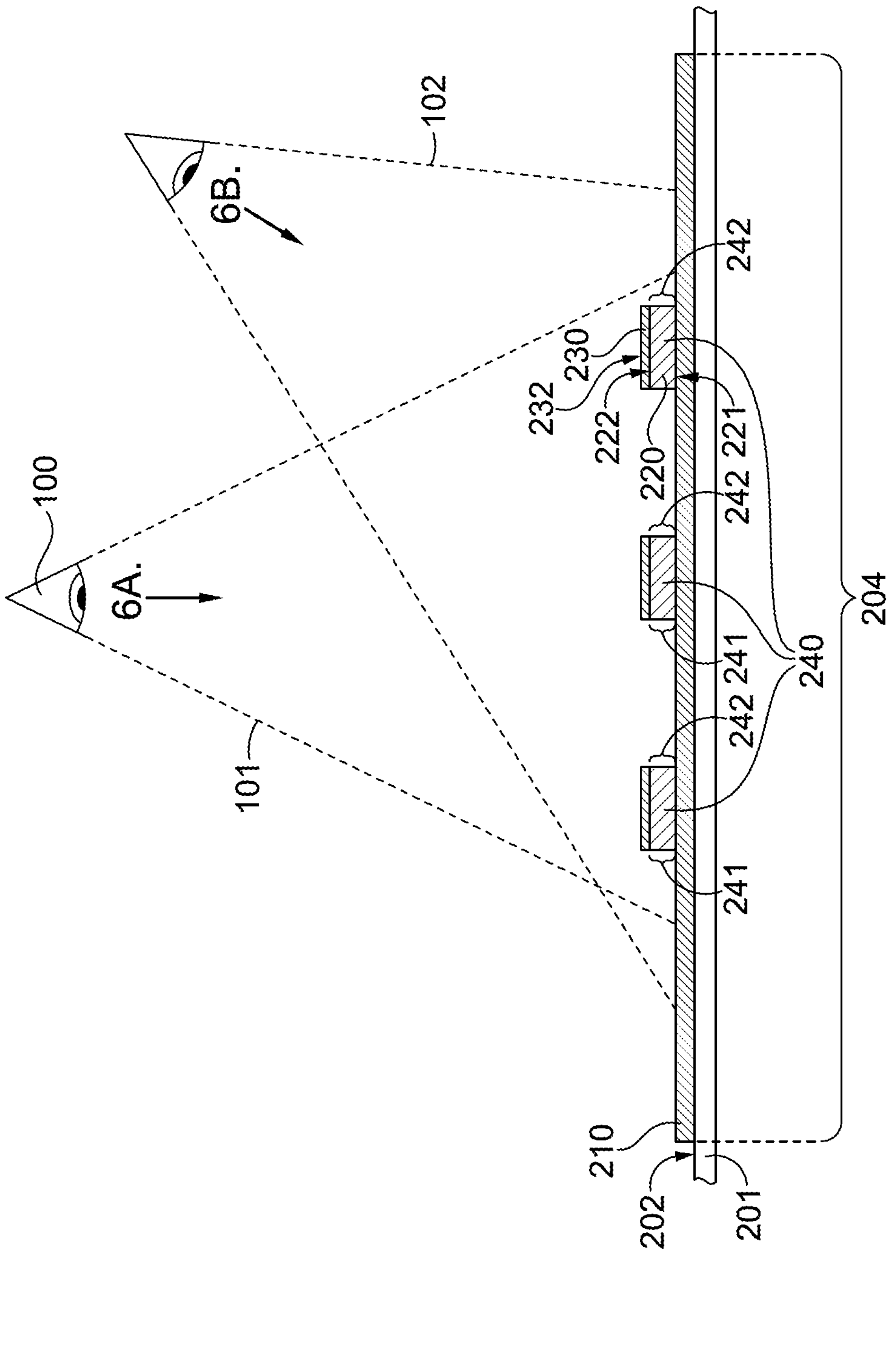
FIG. 5 depicts a cross section view of the textile substrate of FIG. 4 taken along the plane 5 of FIG. 4, in accordance with an aspect hereof.

FIG. 5 depicts a cross section view of the textile substrate 201 taken along the plane 5 of FIG. 4 that is similar to FIG. 2A. As shown, the second ink layer 220 may comprise a second ink layer top surface 222 that is positioned distal to the first ink layer surface 212, a second ink layer bottom surface 221 that is positioned opposite the second ink layer top surface 222, and a second visual component 224. The second ink layer 220 further comprises one or more discrete members 240, each of which includes two opposite exterior sides, a first exterior side 241 and a second exterior side 242, that extend between the second ink layer bottom surface 221 and the second ink layer top surface 222. In this example, the plurality of discrete members 240 are arranged in a curvilinear manner throughout a portion of the first area 204, and the second visual component 224 is presented at the first and second exterior sides 241, 242.

Figure 6A:
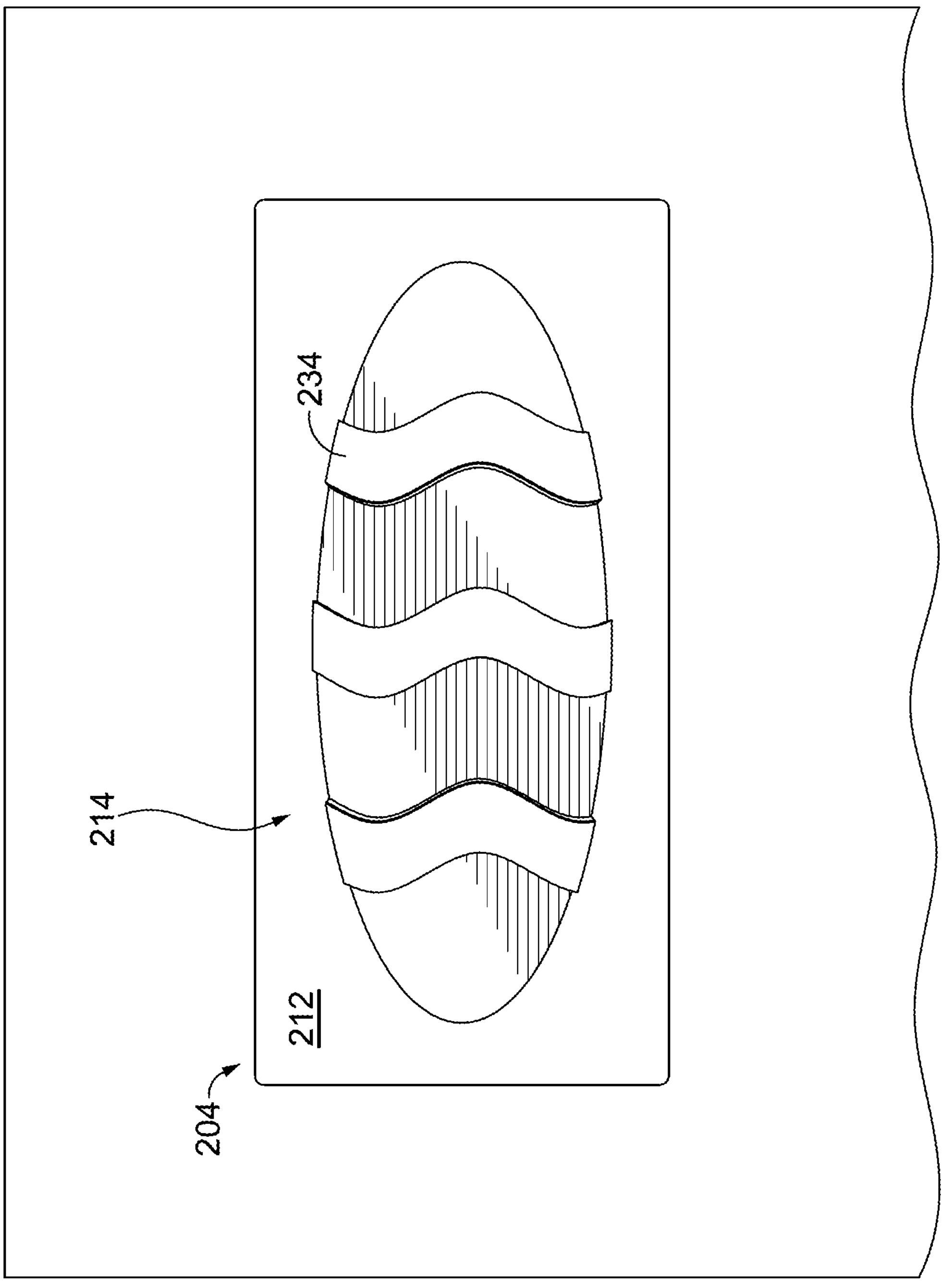
FIG. 6A depicts a view of the textile substrate of FIG. 4 from a first angle, in accordance with an aspect hereof.
Figure 6B:
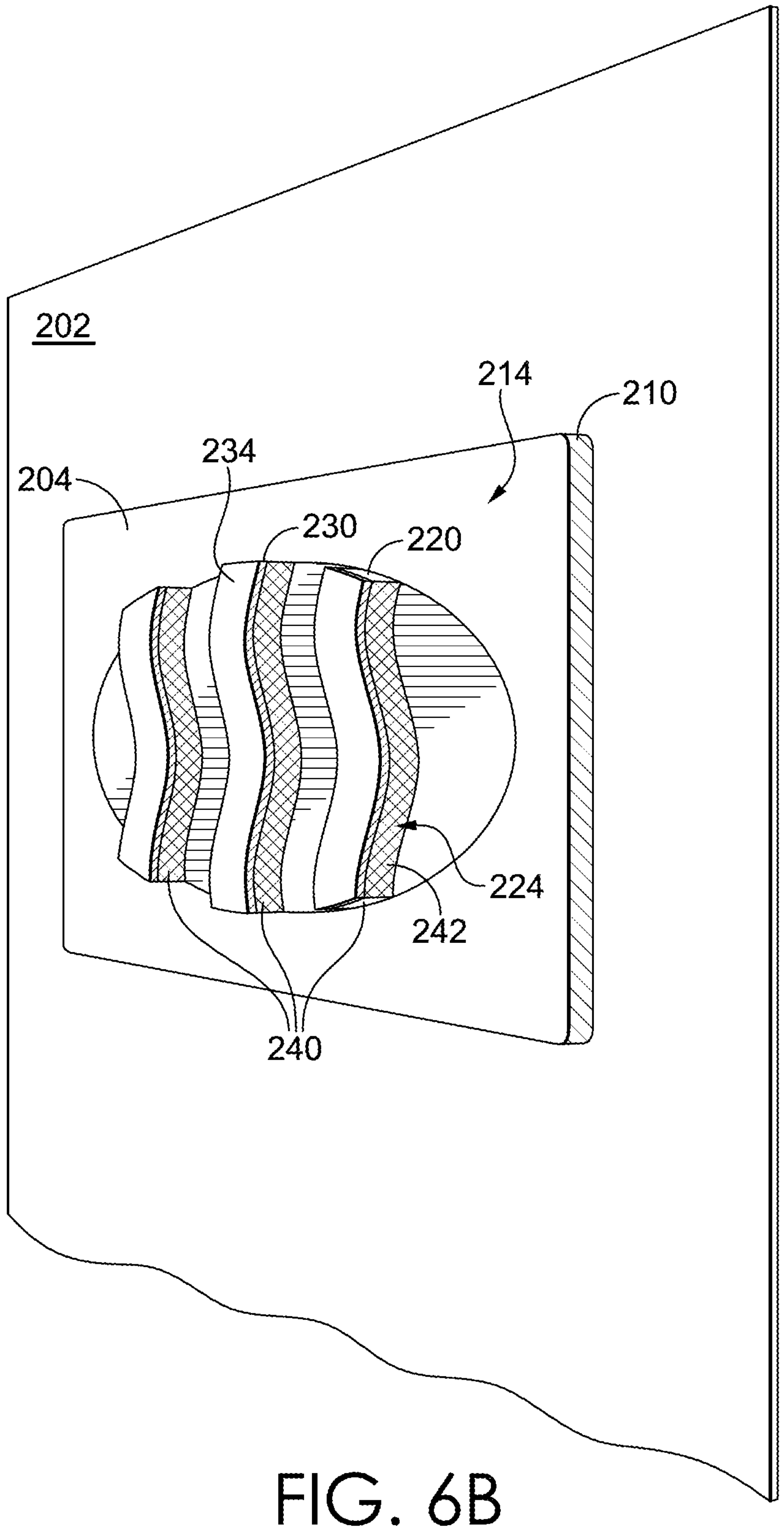
FIG. 6B depicts a view of the textile substrate of FIG. 4 from a second angle, in accordance with an aspect hereof.

Continuing with FIG. 5, a configuration of the first, second, and third ink layers 210, 220, 230 is also shown, which is similar to the first, second, and third ink layers 10, 20, 30. Moreover, it is contemplated herein that one or more additional ink layers may be included in a same manner like in the first, second, and third ink layers 10, 20, 30. FIG. 5 also depicts the observer 100 viewing the textile substrate 201 from the first angle 101 (i.e., an angle normal to the surface plane of the textile substrate 201) and from the second angle 102 that are shown in FIGS. 6A and 6B, which illustrate the same aspects as FIGS. 3A and 3B.

Figure 7:
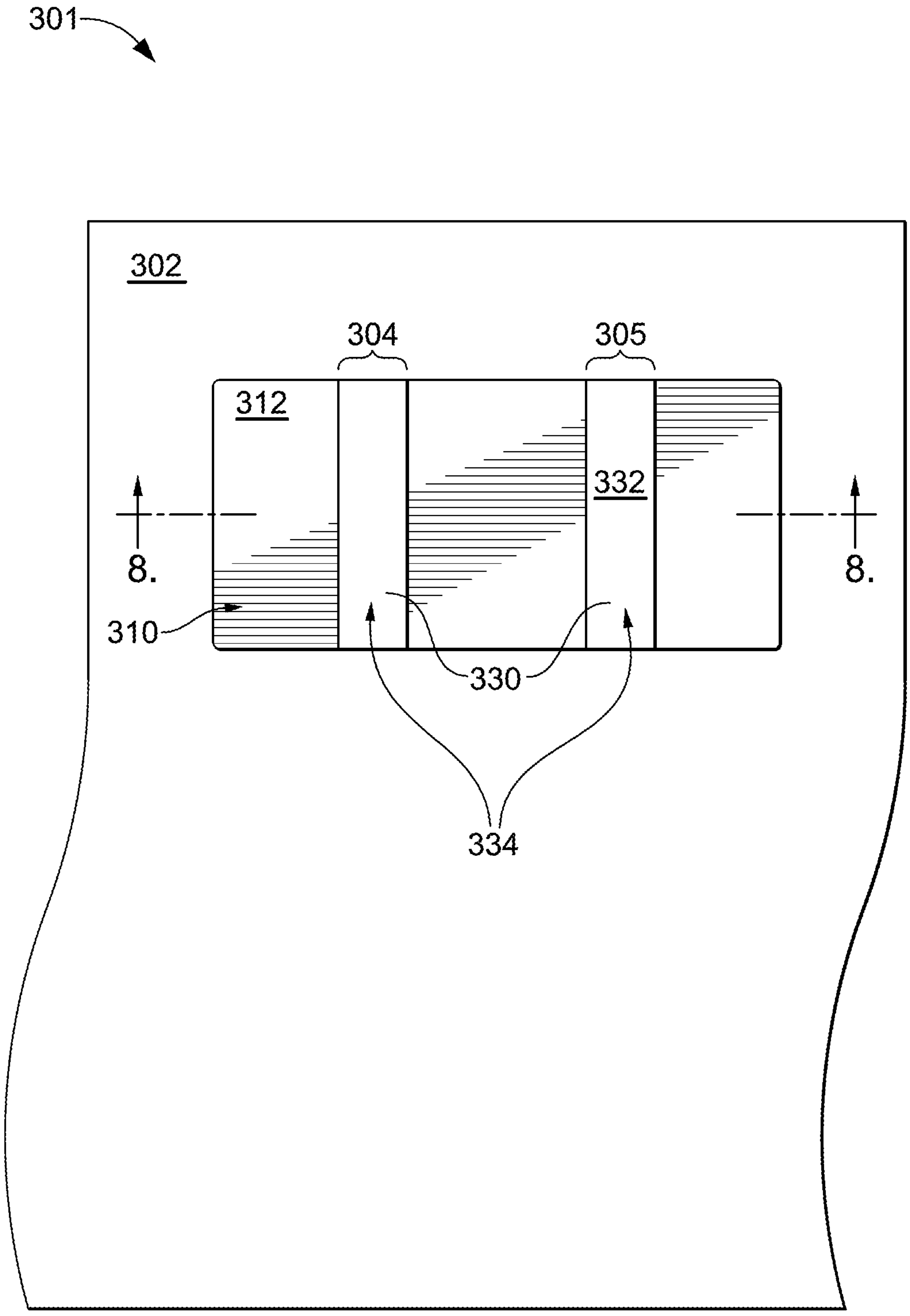
FIG. 7 depicts a top view of an additional embodiment of a textile substrate, in accordance with an aspect hereof.
Figure 8:
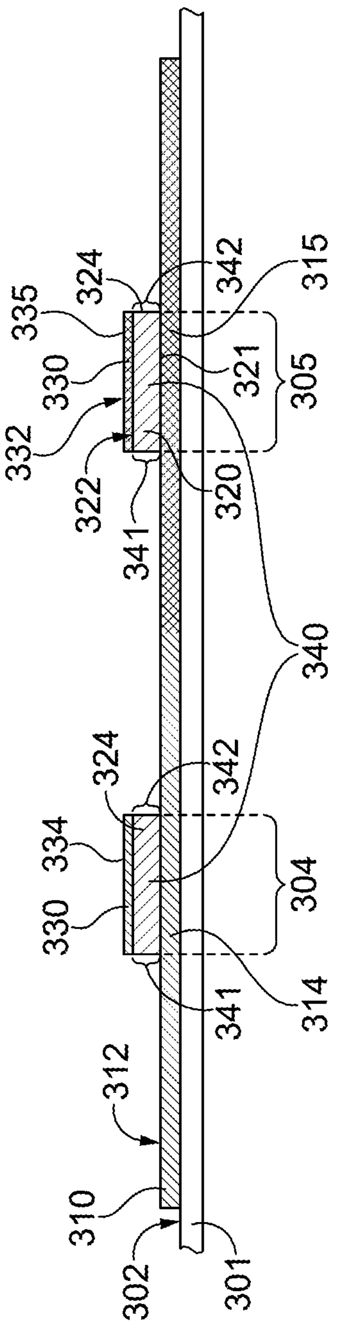
FIG. 8 depicts a cross section view of the textile substrate of FIG. 7 taken along the plane 8 of FIG. 7, in accordance with an aspect hereof.

In FIGS. 7 and 8, an additional embodiment of a textile substrate 301 is depicted, and as can be seen, the textile substrate 301 may comprise many of the same components as the textile substrates 1, 201 of FIGS. 1-6B, but the textile substrate 301 has a first area 304 and a second area 305. Moreover, the textile substrate 301 also has a textile substrate surface 302 and again comprises a first ink layer 310, a second ink layer 320, and a third ink layer 330. However, as indicated in FIGS. 7 and 8, the first ink layer 310 comprises a first visual component 314 at the first area 304 and a second visual component 315 at the second area 305, and a third ink layer 330 comprises a fourth visual component 334 at the first area 304 and a fifth visual component 335 at the second area 305. In one aspect, the first and fourth visual components 314, 334 of the first and third ink layers 310, 330, respectively, are configured to visually match, and likewise, the second and fifth visual components 315, 335 are also configured to visually match. Other than these aspects, the textile substrate 301 and any remaining aspects thereof are similar and correspond to the aspects of the textile substrates 1, 201 in FIGS. 1-6B. Accordingly, many aspects that were previously discussed in connection with the textile substrates 1, 201 in FIGS. 1-6B may not be discussed with the textile substrate 301 in FIGS. 7 and 8. Once again, this is not meant to be limiting, and any aspects discussed in connection with the textile substrates 1, 201 are also applicable to the textile substrate 301 and vice versa.

As can be seen in FIGS. 7 and 8, the first ink layer 310 comprises a first ink layer surface 312 positioned distal to the textile substrate surface 302, and the third ink layer 330 comprises a third ink layer surface 332 that is positioned distal to a second ink layer top surface 322 of the second ink layer 320. Further, the second ink layer top surface 322 is positioned distal to the first ink layer surface 312, and the second ink layer 320 comprises a second ink layer bottom surface 321 that is positioned opposite the second ink layer top surface 322, and a second visual component 324 at both the first and second areas 304, 305. The second ink layer 320 further comprises one or more discrete members 340, each of which includes two opposite exterior sides, a first exterior side 341 and a second exterior side 342, that extend between the second ink layer bottom surface 321 and the second ink layer top surface 322. In this example, the plurality of discrete members 340 are arranged in a linear manner throughout a portion of the first area 304, and the second visual component 324 is presented at the first and second exterior sides 341, 342. Although the plurality of discrete members 340 are shown arranged in a linear manner, it is contemplated herein that the plurality of discrete members 340 may also be arranged in a curvilinear manner. Any and all aspects, and any variation thereof, are contemplated as being within aspects herein.

Continuing with FIG. 8, a configuration of the first, second, and third ink layers 310, 320, 330 is also shown, which is similar to the first, second, and third ink layers 10, 20, 30 and 210, 220, 230. Moreover, it is contemplated herein that one or more additional ink layers may be included in a same manner like in the first, second, and third ink layers 10, 20, 30 and 210, 220, 230. Even though it is not shown, if the observer 100 in FIGS. 2A and 2B were to be viewing the textile substrate 301 from the first angle 101, the second angle 102, or the third angle 103, then the same aspects that are depicted in FIGS. 3A, 3B, 3C, 6A, and 6B in connection with the textile substrates 1, 201 would be visible and are therefore also applicable to the textile substrate 301.

In accordance with aspects herein, FIGS. 1-8 illustrate example configurations of a textile substrate comprising two or more ink layers that may be utilized to provide a print with two distinguishable images or graphics that are presented by one or more visual components when a textile substrate is viewed by an observer from different angles. Moreover, it is contemplated that these example configurations may be altered or modified to control other characteristics of a textile substrate, and as such, aspects are not limited to or by any of the examples discussed or described herein. Further, many aspects depicted in FIGS. 1-8 are illustrative and may be presented in a manner that is best suited for explanatory purposes. For instance, the two or more ink layers may be depicted as having similar heights but such depictions are not meant to be limiting, and aspects herein contemplate that a height of any of the two or more ink layers may be configured as needed to produce a print with two distinguishable images or graphics by one or more visual components of the two or more ink layers.

Continuing with these aspects, it is contemplated that one of the two or more ink layers may be formed of a single layer of high density ink or may be formed by multiple sublayers of a high density ink that are positioned on top of one another. Regardless of whether the one ink layer of the two or more ink layers is formed by a single layer or multiple sublayers, such aspects contemplate that the one ink layer may have a height of at least about 300 microns and up to about 700 microns. Further aspects contemplate that the one ink layer may have a height from about 350 microns to about 650 microns, from about 400 microns to about 600 microns, from about 450 microns to about 550 microns, from about 475 microns to about 525 microns, or from about 490 microns to about 510 microns. In other aspects, it is contemplated that each sublayer of the multiple sublayers that form the one ink layer may have a height of at least about 100 microns and up to about 300 microns. Additional aspects contemplate that each sublayer of the multiple sublayers may have a height from about 150 microns to about 250 microns, from about 175 microns to about 225 microns, or from about 190 microns to about 210 microns. In even further aspects, it is contemplated that a height of each sublayer in the multiple sublayers collectively form an aggregate height that may be a height of the one ink layer. As such, aspects herein contemplate that each sublayer in the multiple sublayers may have an aggregate height of at least about 300 microns and up to about 700 microns. Aspects also contemplate that each sublayer in the multiple sublayers may have an aggregate height from about 350 microns to about 650 microns, from about 400 microns to about 600 microns, from about 450 microns to about 550 microns, from about 475 microns to about 525 microns, or from about 490 microns to about 510 microns. As used herein, when referring to a height or an aggregate height in microns of an ink layer, a sublayer, or multiple sublayers, the term "about" means ±5 microns.

Figure 9:
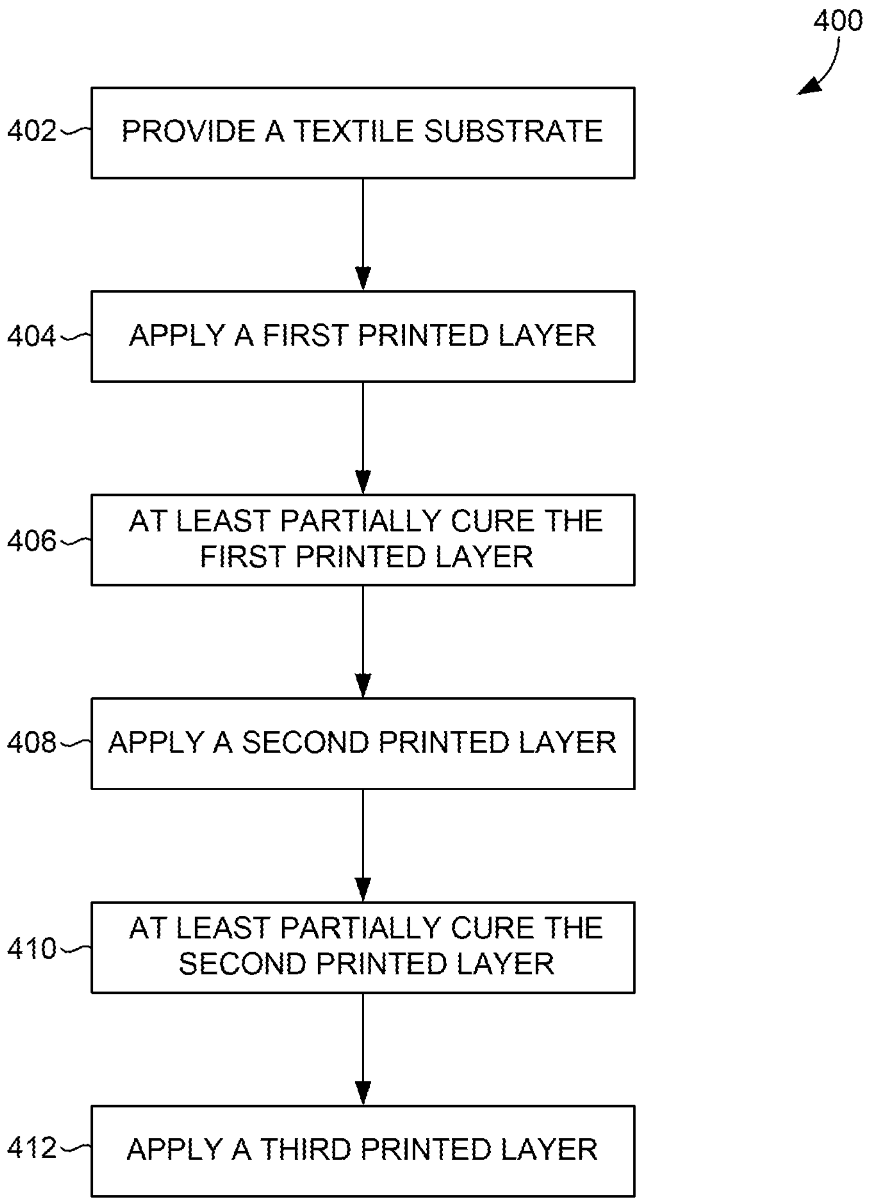
FIG. 9 depicts a flow diagram of a method of printing a textile substrate, in accordance with an aspect hereof.

Returning to the FIGS. and with reference now to FIG. 9, a flow diagram 400 is depicted that represents a method of printing a textile substrate in accordance with aspects hereof. To aid in explanation, the flow diagram 400 will be described with general reference to aspects of the textile substrates 1, 201, and 301 previously described in FIGS. 1-3B. At a block 402, a textile substrate is provided. The textile substrate may include a textile substrate surface and one or more areas. Next, as depicted at a block 404, a first printed layer is applied over the textile substrate, which may be applied at one or more of the areas using any of the printing techniques discussed herein. In accordance with aspects herein, it is contemplated that the first printed layer may be applied using digital direct printing and may include one or more visual components that form an image or graphic. At a block 406, after application of the first printed layer, it is contemplated that the first printed layer may be at least partially cured.

Continuing with FIG. 9, a step depicted at the block 408 may be performed and a second printed layer may be applied over at least a portion of a surface of the first printed layer, and it is contemplated that the step at block 408 may be repeated such that the second printed layer comprises one or more layers of ink, which are contemplated to be a high density ink that may be applied using one or more of the printing techniques discussed herein. In some aspects, the second printed layer may be applied via screen printing and may be performed in a manner that causes the second printed layer to have a height that may be sufficient for an observer to view one or more exterior sides of the printed layer when viewing the textile substrate from a side angle. Such aspects may include forming the second printed layer of at least two or more layers of high density ink, and it is also contemplated that the second printed layer may have a height in microns of any of the ranges as discussed herein in connection with a height of one of the two or more ink layers. Moreover, the second printed layer may comprise a visual component that, once the method 400 is completed, may be presented at one or more exterior sides of the second printed layer. It is contemplated that the visual component may be a color component provided by the one or more inks that form the second printed later. Once application of the second printed layer has been performed, it is contemplated that the second printed layer may be at least partially cured as depicted at a block 410.

In the next step, shown in a block 412 of FIG. 9, a third printed layer may be applied over a surface of the second printed layer, and it is contemplated that the third printed layer may be applied using any of the printing techniques discussed herein. Aspects contemplate that the third printed layer may include a visual component presented at a surface of the third printed layer that masks the visual component of the second printed layer, which may, at least in part, be achieved as the third printed layer is applied over the second printed layer. Further, it is also contemplated that the visual component of the third printed layer may be configured to visually match the visual component of the first printed layer, and in such aspects, an image or graphic that was formed by the visual component of the first ink layer, may again be applied as the third printed layer over the second printed layer via digital direct printing.

Staying with these aspects, it is further contemplated that printing techniques discussed herein may utilize electronic image files to form printed layers that include graphics or images that were encompassed in electronic image files. For example, digital direct printing may include using a computer to instruct a digital direct printer to form an ink layer or printed layer on a textile substrate that corresponds to a graphic or image encompassed in an electronic image file. In some aspects, an electronic image file that encompasses a same graphic or image may be utilized to form two or more ink layers that visually match. For example, an electronic image file may be utilized to form a first ink layer via digital direct printing, and the electronic image file may again be utilized to form an additional ink layer above the first ink layer via digital direct printing. In some aspects, only some of the electronic image file may be utilized to form the additional ink layer, and thus, the additional ink layer may not fully extend above the first ink layer but instead, may partially extend above a portion of the first ink layer. In either case, the first ink layer and the additional ink layer include visual components that correspond to one another, or stated differently, a visual component at a first location of the additional ink layer corresponds to a visual component of the first ink layer that is positioned directly below the first location of the additional ink layer.

In one example, these aspects may be utilized in connection with a method for printing a textile substrate, which may include applying a first printed layer via digital direct printing that may be formed by two or more passes of a digital direct printer. Further, the first printed layer may include multiple inks with one or more color components, one or more visual characteristics, or combinations thereof that collectively form a visual component. It is also contemplated that a digital direct printer may be configured to print the textile substrate with a graphic or image of an electronic image file. The digital direct printer may apply the multiple inks in a manner such that the visual component of the first printed layer comprises a graphic or image that corresponds to a graphic or image of an electronic image file. Next, a second printed layer may then be applied over a portion of the first printed layer using screen printing, and the second printed layer may include a high density ink and have a sufficient height to present exterior sides. Moreover, the second printed layer may be applied in a manner such that it is arranged to form a pattern or design that protrudes above the first printed layer and presents one or more color components or visual characteristics of inks that form the second printed layer at the exterior sides and a surface of the second printed layer. Collectively, one or more color component, one or more visual characteristics, a pattern or design, and combinations thereof may form a visual component of the second printed layer.

Continuing with this example, a third printed layer may be applied over the surface of the second printed layer that may be formed by one or more passes of a digital direct printer, and the third printed layer may include a visual component that is formed by multiple inks, with one or more color components, one or more visual characteristics, or combinations thereof. Moreover, in a manner similar to the first printed layer, the digital direct printer may apply multiple inks in a manner such that the visual component of third printed layer comprises at least a portion of a graphic or image that corresponds to a graphic or image of an electronic image. In some aspects, it is contemplated that a same electronic image file may be used to apply the first printed layer and the third printed layer, and therefore, the visual component of the third printed layer may correspond to at least a portion of the visual component of the first printed layer. Taken further, at locations where the first printed layer and the third printed layer are vertically aligned on the textile substrate (i.e., an area of the first printed layer that is positioned directly below an area of third printed layer), the visual component of the third printed layer may visually match the visual component of the first printed layer.

In accordance with these aspects, it is contemplated that application of the third printed layer causes the visual component of the third printed layer to mask the visual component of the second printed layer that was presented at the surface of the second printed layer prior to application of the third printed layer. Nevertheless, the pattern or design, one or more color components, one or more visual characteristics, or combinations thereof that form the visual component of the second printed layer are still presented at the exterior sides, and thus, when an observer views the textile substrate from different angles in which the exterior sides are more or less visible, the second visual component also become more or less visible.

It will be understood that certain features and subcombinations are of utility and may be employed without reference to other features and subcombinations. This is contemplated by and is within the scope of the claims.

While specific elements and steps are discussed in connection to one another, it is understood that any element and/or steps provided herein is contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

What is claimed is:

1. A method of printing a textile substrate, the method comprising:

providing a textile substrate having a textile substrate surface and at least a first area;

applying a first printed layer over the first area of the textile substrate, the first printed layer comprising a first visual component that forms a first image;

applying a plurality of discrete members as a second printed layer over a top surface of the first printed layer distal to the textile substrate surface, the second printed layer comprising one or more layers of ink, and wherein each of the plurality of discrete members comprises a second visual component; and applying a third printed layer over a surface of the second printed layer distal to the first printed layer, the third printed layer comprising a third visual component, wherein only the first visual component and the third visual component are visible when the textile substrate is viewed from a first angle, and wherein the application of the third printed layer causes a visibility of the second visual component to change when the textile substrate is viewed from an angle that is different than the first angle.

2. The method of printing the textile substrate of claim 1 further comprising, subsequent to the application of the first printed layer, the second printed layer, or the third printed layer, at least partially curing one or more the first printed layer, the second printed layer, and the third printed layer.

3. The method of printing the textile substrate of claim 1, wherein the third visual component of the third printed layer is configured to visually match the first visual component of the first printed layer when the textile substrate is viewed from the first angle.

4. The method of printing the textile substrate of claim 1, wherein the third printed layer is applied via a digital direct printing technique.

5. The method of printing the textile substrate of claim 1, wherein the second printed layer comprises one or more layers of high density ink.

6. The method of printing the textile substrate of claim 1, wherein the each of the plurality of discrete members comprises one or more exterior sides extending away from the first printed layer.

7. The method of printing the textile substrate of claim 6, wherein the second visual component of the second printed layer comprises one or more color components at each of the one or more exterior sides of the each of the plurality of discrete members.

8. The method of printing the textile substrate of claim 1, wherein the application of the second printed layer comprises applying the second printed layer as the plurality of discrete members arranged in a linear pattern throughout the first area of the textile substrate.

9. The method of printing the textile substrate of claim 1, wherein the application of the second printed layer comprises applying the second printed layer as the plurality of discrete members arranged throughout the first area of the textile substrate.

10. The method of printing the textile substrate of claim 9, wherein the each of the plurality of discrete member has one or more exterior sides.

11. The method of printing the textile substrate of claim 10, wherein the second visual component is collectively formed by an arrangement of the plurality of discrete members throughout the first area of the textile substrate and the one or more exterior sides of the each of the plurality of discrete members.

12. The method of printing the textile substrate of claim 1, wherein the each of the plurality of discrete members comprises a fourth visual component that collectively form a third image.

13. The method of printing the textile substrate of claim 1, wherein the first printed layer forms the first visual component image at the top surface in the first area.

14. The method of printing the textile substrate of claim 1, wherein the second printed layer is applied over less than an entirety of a top surface of the first printed layer.

15. The method of printing the textile substrate of claim 1, wherein the first printed layer is applied over an entirety of the first area of the textile substrate.

* * * * *